April 8, 1930.  J. GOETZMANN  1,753,202
WEIGHING AND RECORDING MACHINE
Filed April 30, 1926    13 Sheets-Sheet 4
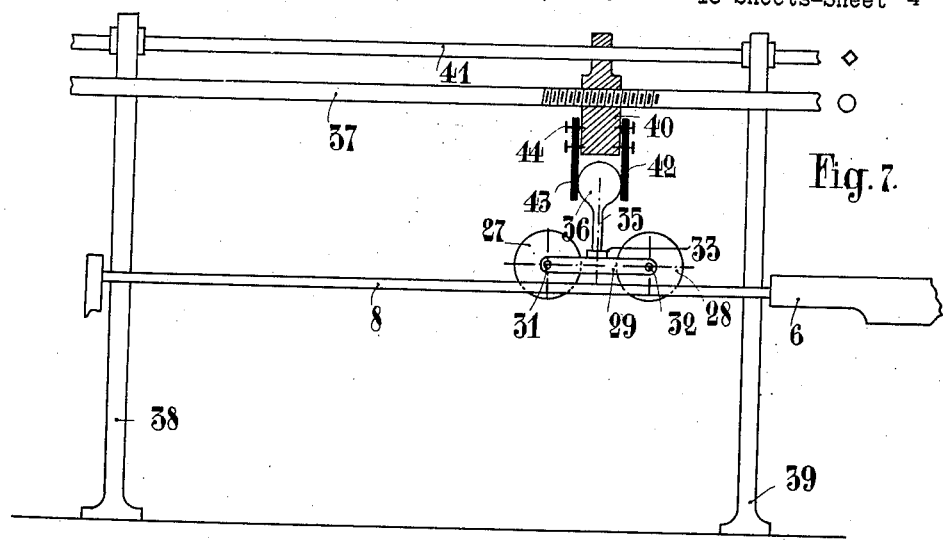
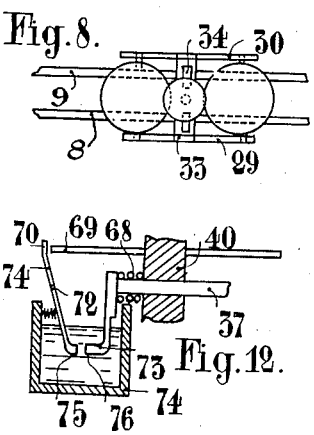
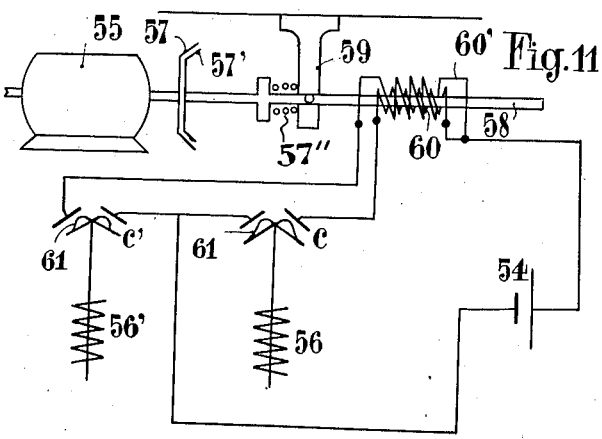
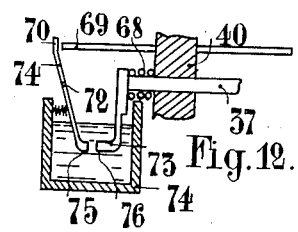
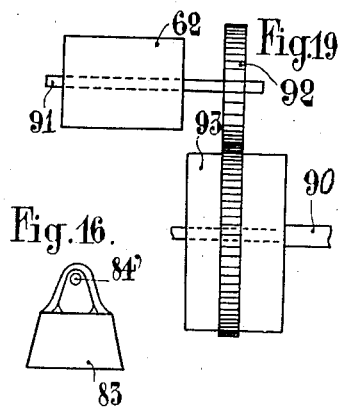
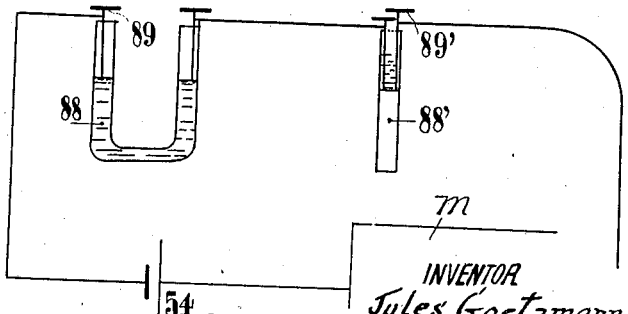
INVENTOR
Jules Goetzmann
BY Richards & Geier
ATTORNEY

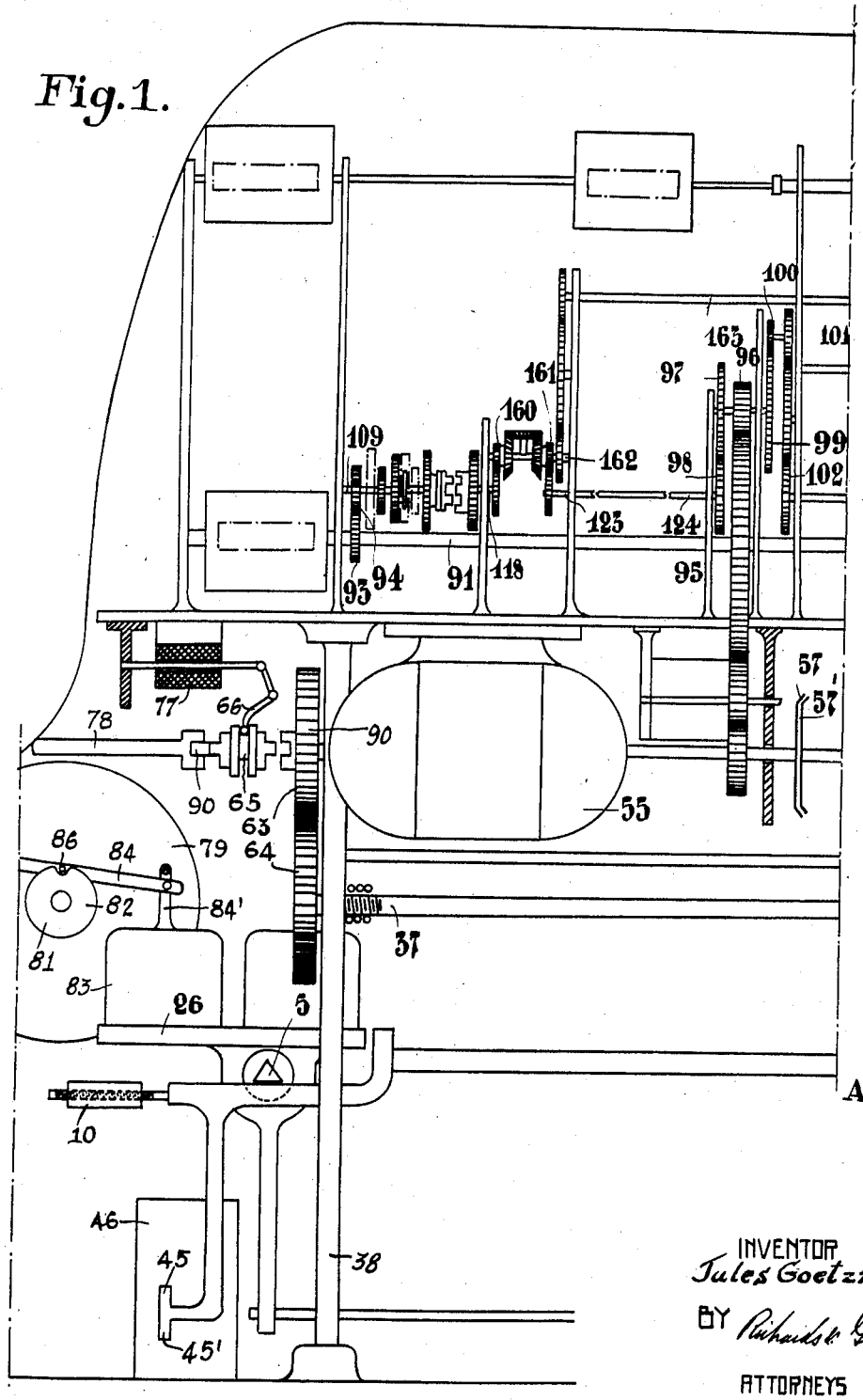

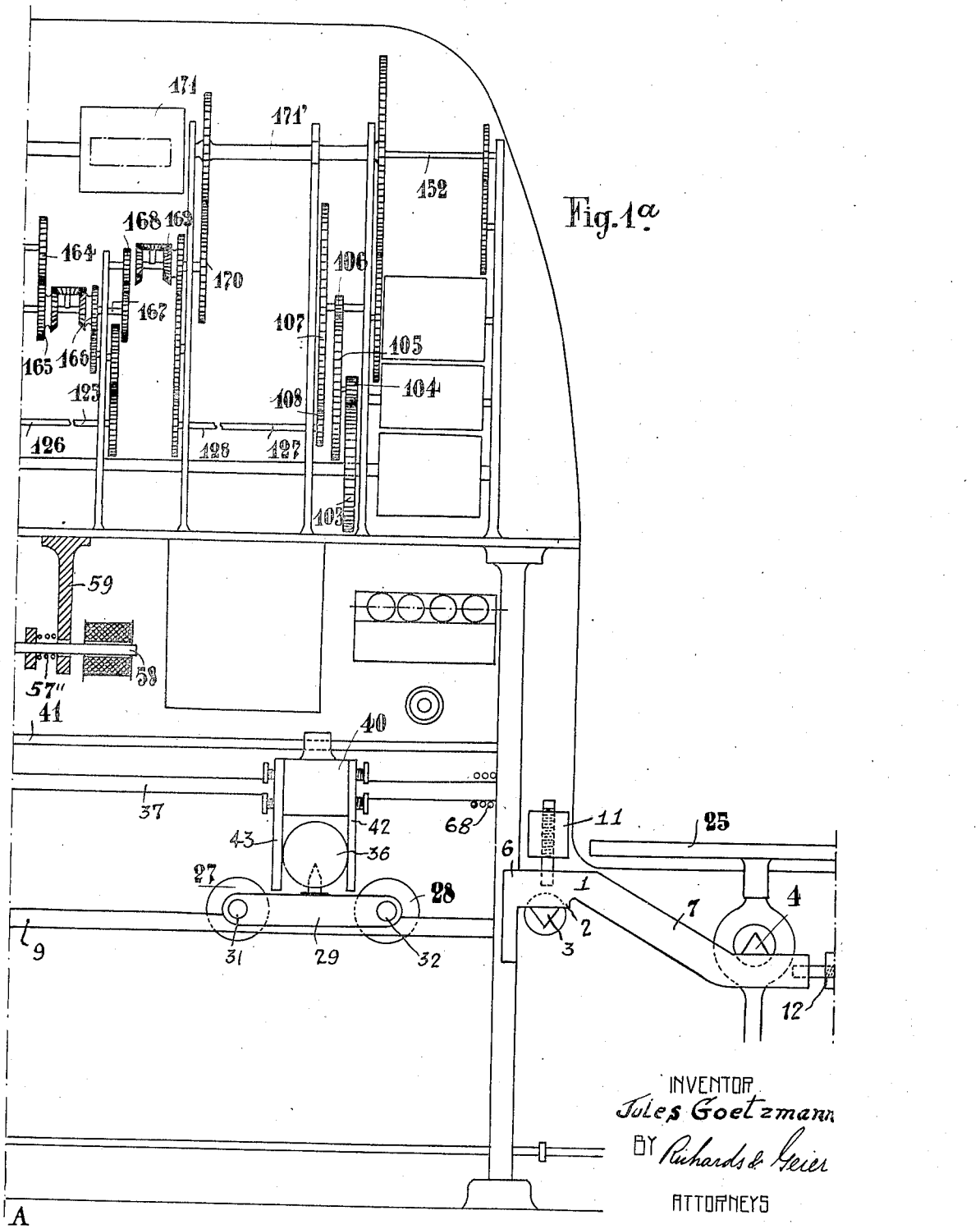

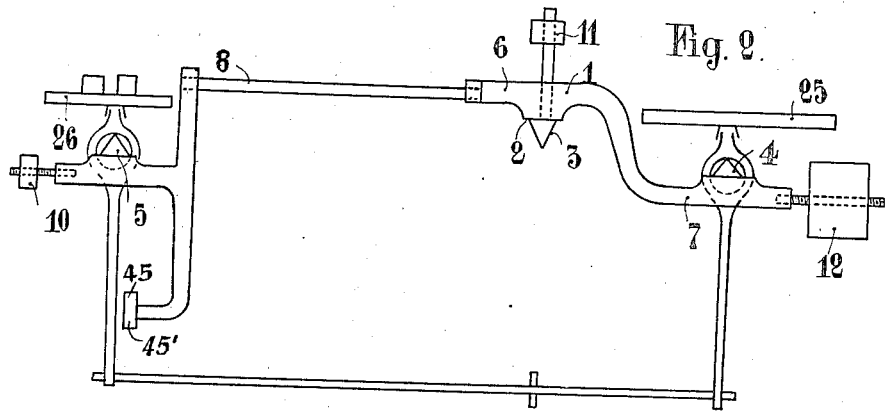
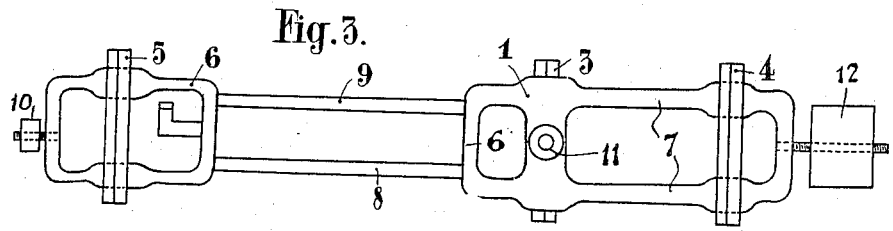
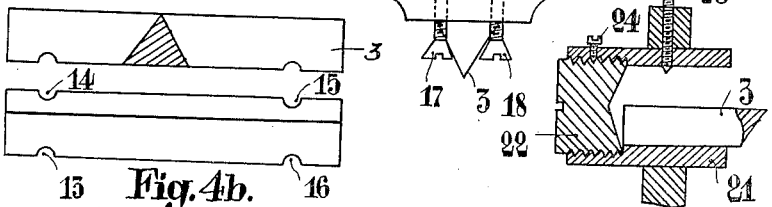
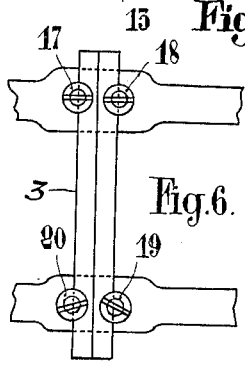
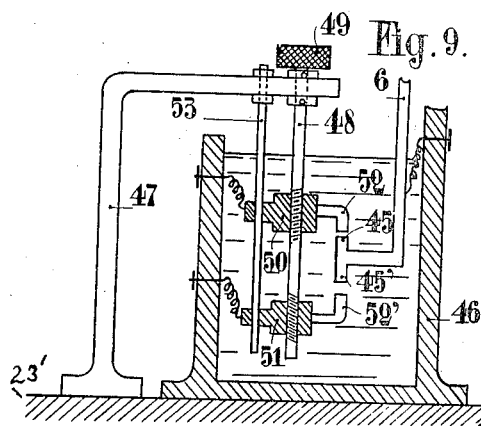

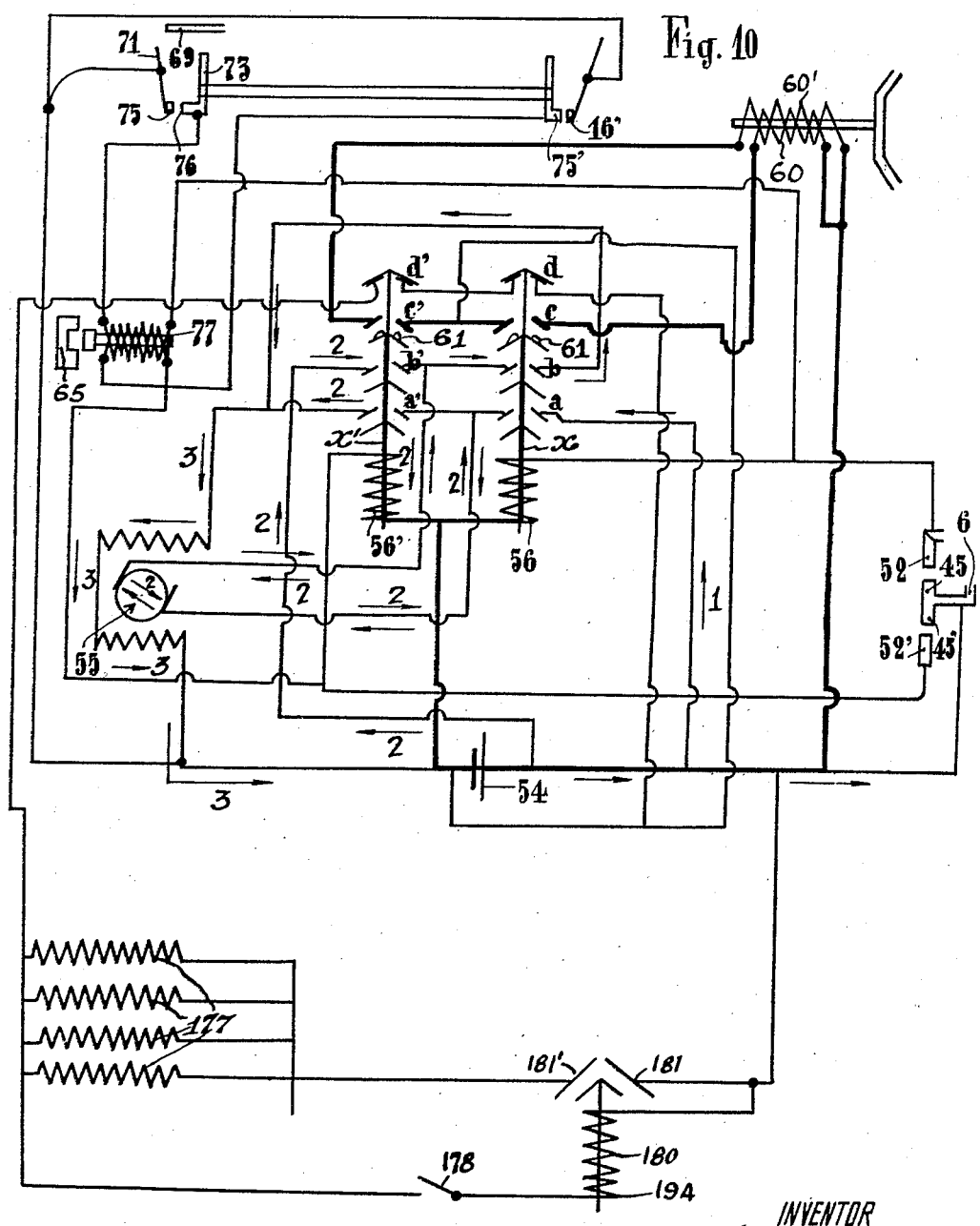

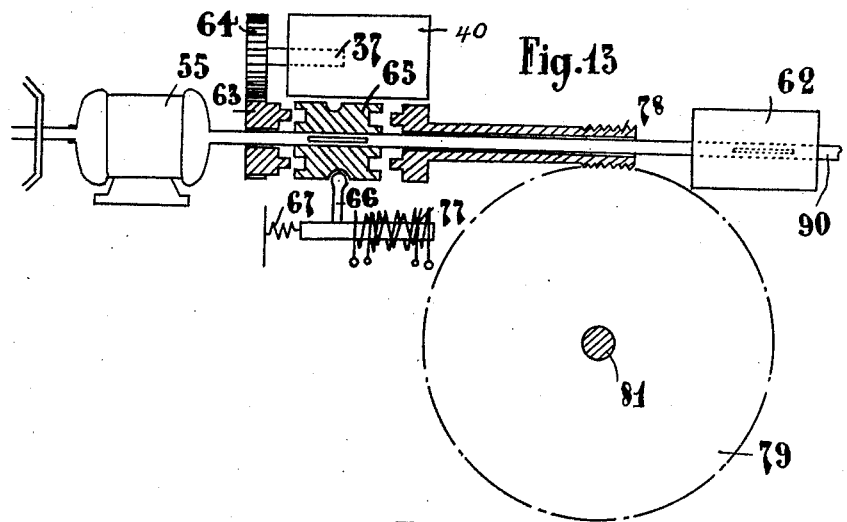
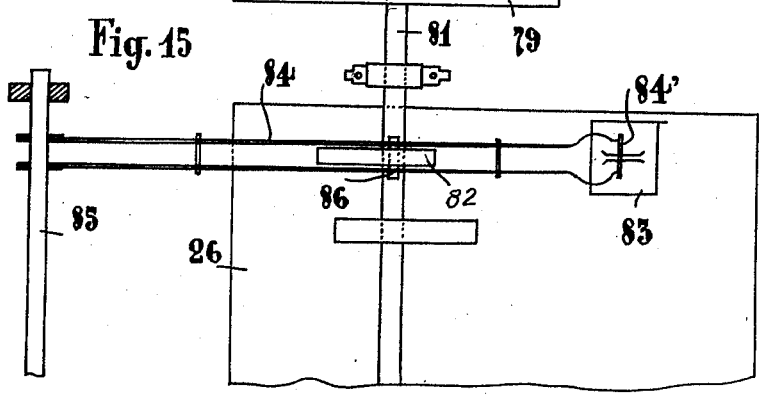
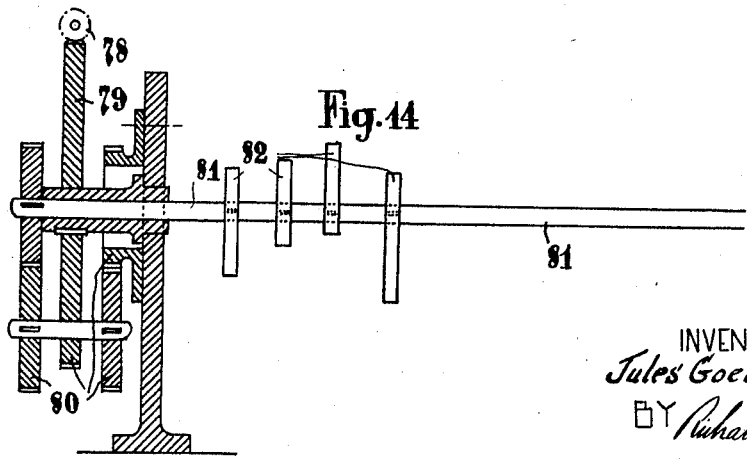

April 8, 1930.   J. GOETZMANN   1,753,202
WEIGHING AND RECORDING MACHINE
Filed April 30, 1926    13 Sheets-Sheet 7
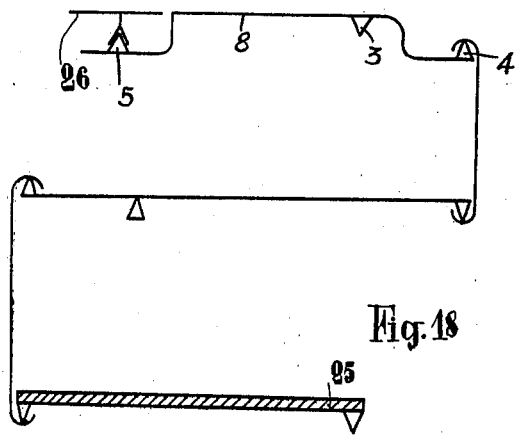
Fig. 18
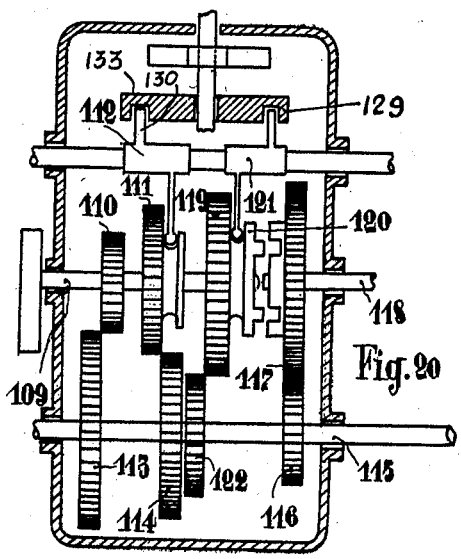
Fig. 20
Fig. 23
| 139 ▭ | 148 ▭ | 152 ▭ | 156 ▭ |
| 140 ○ | 149 ○ | 153 ○ | 157 ○ |
| 141 ○ | 150 ○ | 154 ○ | 158 ○ |
| 142 ○ |       | 155 ○ | 159 ○ |
Fig. 24
| 0,05 ○ | 0,25 ○ | 1 ○ | 5 ○ |
| 0,10 ○ | 0,50 ○ | 2 ○ | 10 ○ |
| 0,15 ○ | 0,75 ○ | 3 ○ | 15 ○ |
| 0,20 ○ |        | 4 ○ | 20 ○ |
INVENTOR
Jules Goetzmann
BY Richards & Geier
ATTORNEY

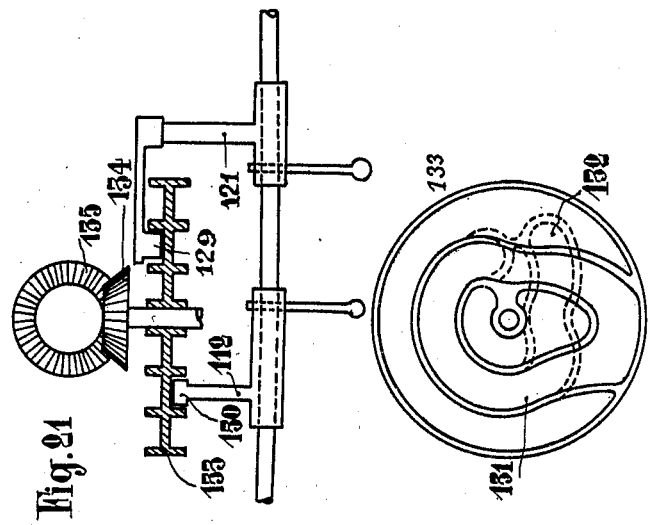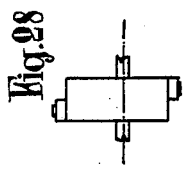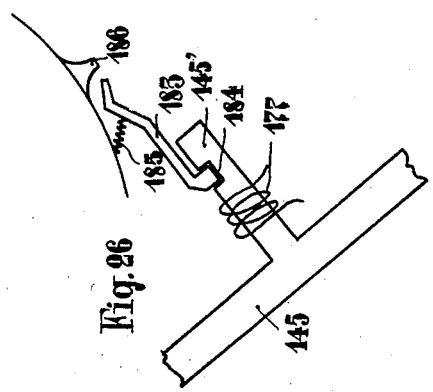

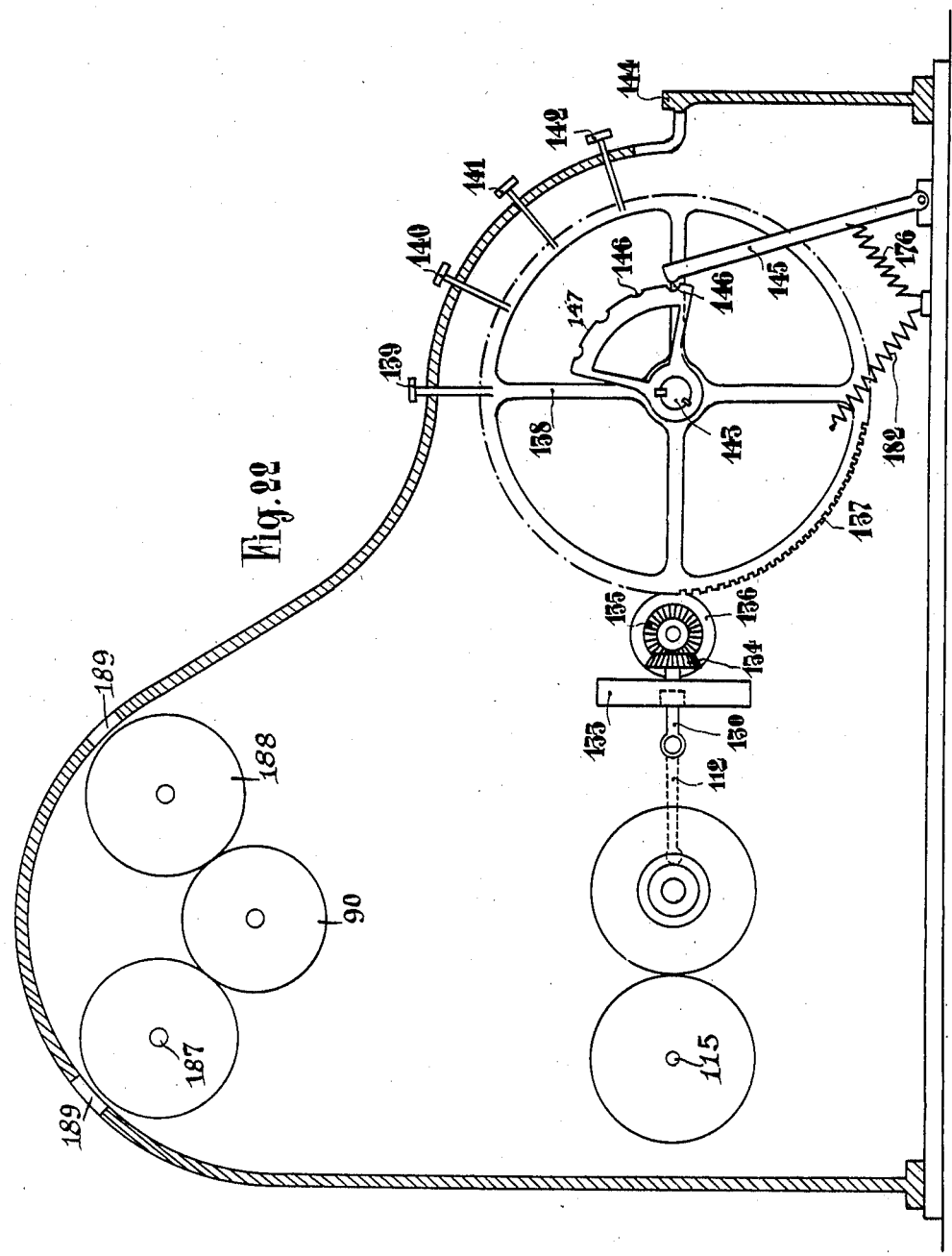

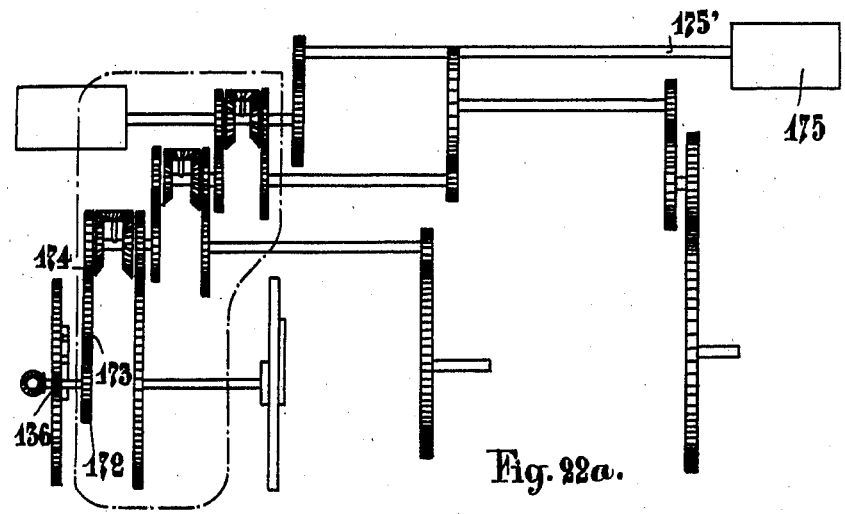
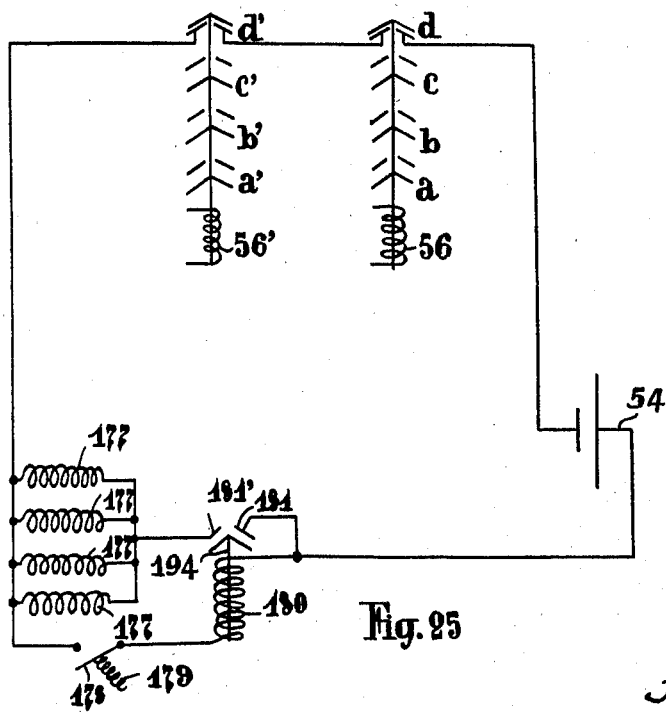

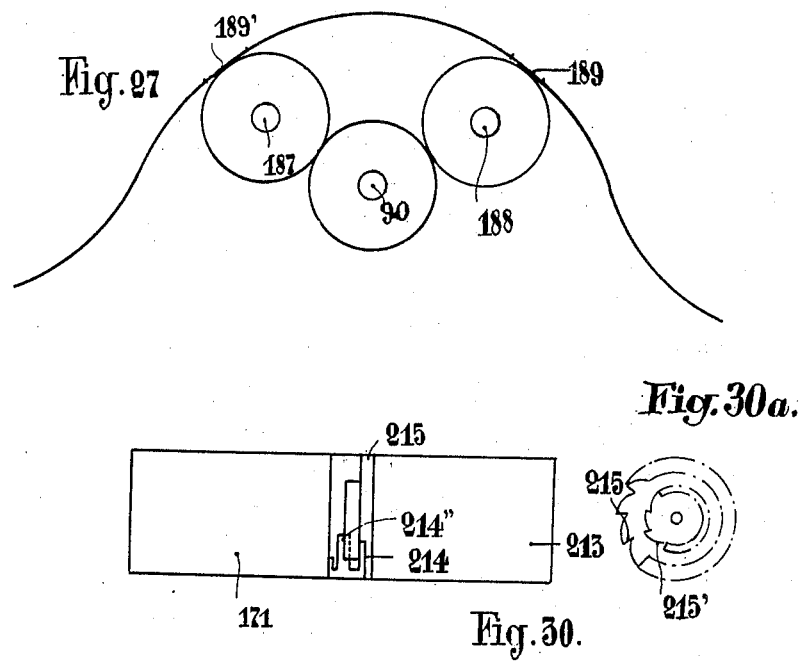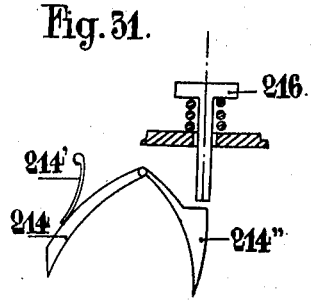

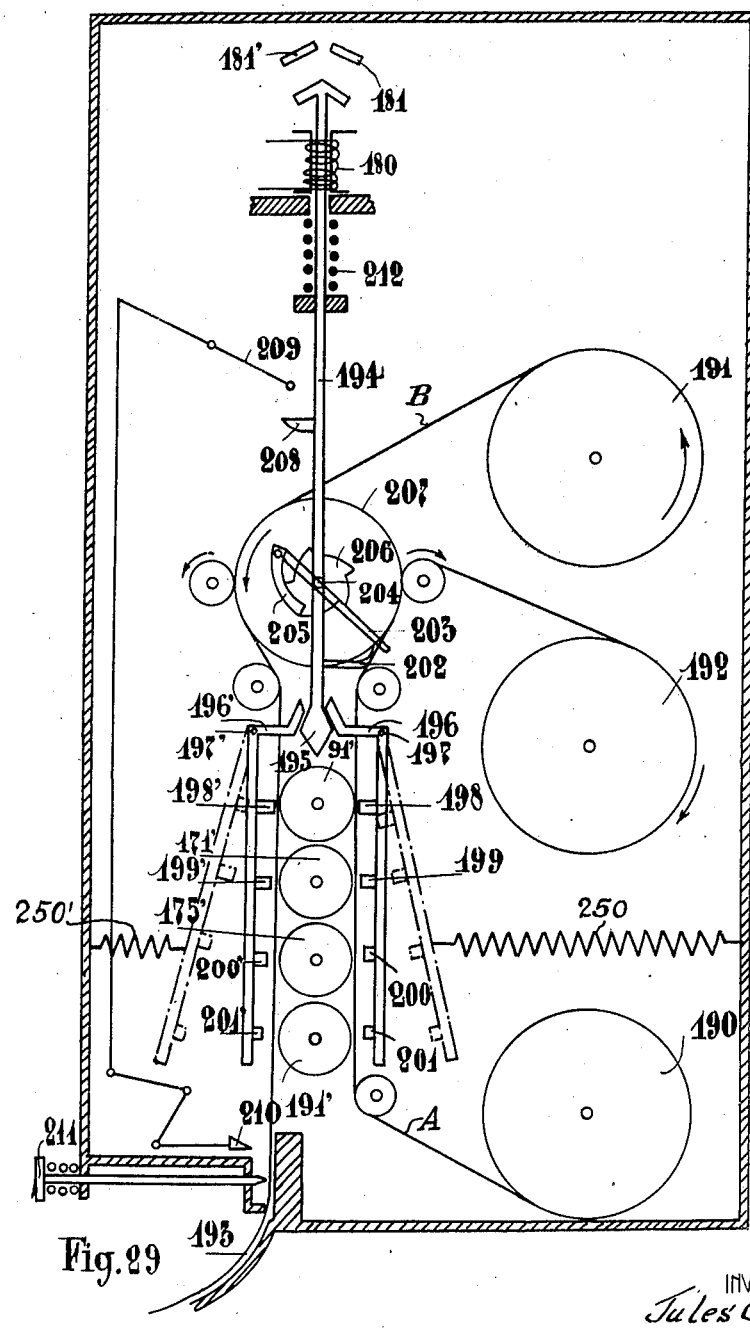

Patented Apr. 8, 1930

1,753,202

UNITED STATES PATENT OFFICE

JULES GOETZMANN, OF PARIS, FRANCE

WEIGHING AND RECORDING MACHINE

Application filed April 30, 1926, Serial No. 105,682, and in France May 11, 1925.

This invention relates to automatic balances for registering weights and prices.

The object of the present invention is to provide a machine adapted automatically to show and register, with the help of electric devices, the weight, the price per unit and the total price of goods or any other stuff placed on the scale when the price per unit has been hand set by suitable and controllable means, while said machine will also register the number of weighings effected and the amount of the takings within a definite time.

Balances showing and registering the weight are already in existence and also others showing the price, but the reading of such machines is difficult, their handling awkward, and they operate with but little sensibility.

According to the present invention these deficiencies are eliminated and a machine put at the disposal of the user that he will be able to set to any price per unit, do away with errors, and permit any definite operation to be effected in a much shorter time than was possible hitherto.

In order that the invention may be more readily understood, one practical embodiment thereof is illustrated, by way of example, in the accompanying drawings:—

Figures 1 and 1ª combine to form a general diagrammatic view of the apparatus.

Figure 2 is an elevation to a reduced scale of the beam, and

Figure 3 is a plan thereof.

Figure 32:
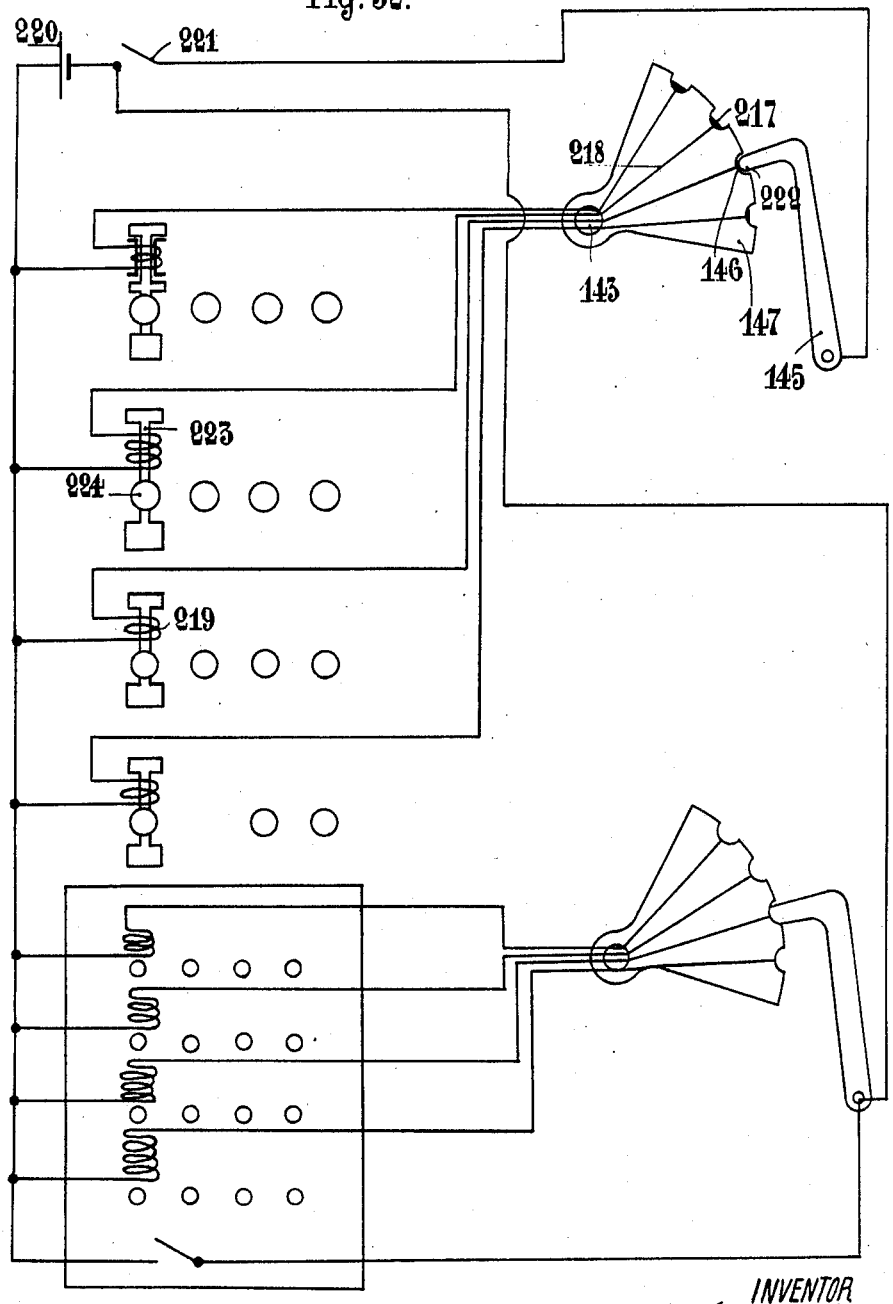

Figures 4, 4ª, 4ᵇ, 5, and 6 are detail views of the beam, showing methods of securing knife edges, more fully referred to hereafter.

Figure 7 is a detail view of the poise and of its working.

Figure 8 is a plan view of the said poise.

Figure 9 is a detail view of the electrical contacts adapted to reverse the motor.

Figure 10 is a general diagrammatic view of the electrical connections.

Figure 11 is a detail view of the motor braking device, showing a modification of the breaking circuit included in Fig. 10.

Figure 12 is a detail view of the motor releasing device.

Figure 13 illustrates said release.

Figure 14 is a view in elevation showing the cam-shaft control.

Figure 15 shows in plan one of the weight supporting levers.

Figure 16 shows one of these weights.

Figure 17 is a detail view of the electrical connections of a leveling device for the apparatus.

Figure 18 shows the system of levers diagrammatically.

Figure 19 is a detail view of a modified form of the counter.

Figure 20 is a view of one of the change speed gears.

Figure 21 is a view, partly in section, of the change speed gear control.

Figure 21ª is a plan view of a plate forming a part of said gear control.

Figure 22 is a cross section of the machine.

Figure 22ª is a view of the unit price counter control.

Figures 23 and 24 are detail views showing the arrangement of the keys.

Figure 25 is a view of the electrical connections controlling the setting of the machine.

Figure 26 is a detail view of the weight setting release.

Figures 27 and 28 show the type discs and their control.

Figure 29 is a view of the registering device.

Figures 30, 30ª and 31 are detail views of the said device.

Figure 32 is a view of the electrical connections for enabling a supervisor to check the unit price on a machine from a distance.

In all the figures the same reference numerals denote the same parts.

This apparatus illustrated comprises a balance of the "Roberval" kind, with equal or unequal arms, combined with a steel-yard the shiftings of the poise weight of which, as well as the putting on and removal of loose weights, are obtained by mechanical means hereinafter described.

The balance of the "Roberval" type (Figure 2) is constructed as follows: A beam 1 is cast with three bosses, such as 2, designed to secure the knife-edges 3, 4, 5. This beam has two arms 6 and 7, one of which 6 carries two parallel drawn steel bars 8 and 9 connected with the cast parts. At 10, 11 and 12 are weights adapted to move along threaded rods in order to adjust the center of gravity of the beam. Each knife-edge is constituted by a triangular bar (Figure 4) made of steel and provided with four notches 13, 14, 15, 16; this arrangement permitting the said knife-edges to be fixed on the bosses 2 by means of screws 17, 18, 19, 20 having sloping heads. These screws allow the knife-edges to be set parallel to one another in one and the same plane and the extreme edges 4 and 5 to be placed a suitable distance from the middle one 3.

The knife-edges rest on bushes 21 cut from a steel tube and morticed according to two inclined planes so as to form a V. Lateral shifting of the said knife-edges is limited by threaded plugs 22 (Fig. 5), one of the ends of which is cone shaped so that the knife-edge will bear thereon at one point only. By screwing and unscrewing the plug 22 lateral play of the beam is adjusted. The bushes 21 are held in the frame 23' (Fig. 5) by screws 23 and, once adjusted, the plugs are kept in place by screws such as 24. The pan-carriers, which are fitted with sockets for the bushes, are prolonged by rods which extend downwardly to be assembled with the lower counter-beam by usual means.

Having described the features of the Roberval balance, it is now necessary to show how, having placed some goods on the scale pan 25 (Figure 2), a poise is, in accordance with the invention, shifted along arm 6 of the beam, and, if required, weights are placed on the scale pan 26 until the equilibrium of the scale is attained, and hereafter the weighing is completed, the poise is returned to its initial position and the weights removed from the scale pan 26.

*Displacement of the poise.*

As has already been stated, the arm 6 of the beam is formed by two cylindrical rods 8 and 9. The poise comprises two spherical rollers 27 and 28 (Figs. 1, 7 and 8) connected by cross-ties 29 and 30 and pivoting round spindles 31 and 32. The two cross-ties are connected together by a member 33 provided with hollow parts, such as 34, which permit taring. Secured to member 33 is a rod 35 ended by a spherical part 36. The above described set constitutes the sliding and, extremely mobile poise, the driving power required to shift it being of a very small order.

This displacement is obtained in the following manner:

A threaded rod 37, maintained by two columns 38 and 39 and fixed to the frame 23' of the machine, carries a nut 40, guided by a square rod 41, so that, if the rod 37 is rotated by any suitable means, say by means of an electric motor 55 and equal gear wheels 63, 64, the nut, unable to turn round said rod 37, is driven in either the one or the other direction according to the direction in which the screw is rotated. This nut has two facets 42 and 43 made of crystal or any other suitable material and fixed by screws, such as 44, permitting them to be moved nearer to or farther away from one another by micrometric displacements. The distance between these facets is, therefore, very finely adjustable. The sphere 36 of the poise is held between the said two facets with an adjustable play of the 1/100th of a millimeter order. Consequently, driving the nut causes the poise to be driven. The friction of the metal sphere on the crystal facet causes the equilibrium position to be upset by a force which, considering the friction coefficient of crystal on steel to be 0,014 ... is of the 1 gram .x0,014 order, that is to say of the centigram order, and, therefore, negligible in respect of the other resistances and in respect of the weighings intended to be made with balances of this kind.

It has been stated that the screw is driven by an electric motor; the starting, stopping and reversing of said motor being automatically operated in the following manner:

The end of beam-arm 6 plunges into an oil-filled container 46 (Fig. 9) secured to the frame 23', this end being formed with two plane thrust-blocks or stops 45 and 45' to which electric current is led by any suitable means. Maintained on a support 47 is a screw 48 having a right and left hand thread. On this screw, which is operable by means of a button 49, are two nuts 50 and 51 carrying thrust contacts 52 and 52' guided by a square rod 53. The operation of the button 49 permits the contacts 52 and 52' to be simultaneously moved away from or towards the stops 45 and 45'. When the balance is poised there is no contact between the said various thrust-plates or stops. The electric circuits are wired according to the diagram shown by Figure 10. For example, suppose that 54 be a source of electric energy, 55 the electric motor, 56 and 56' two relays. When the beam is in equilibrium, that is to say when the beam-arm 6 is horizontal or, rather, when the steel rods of which it is composed are horizontal, there is no contact either between 45 and 52 or between 45' and 52', as the source of electricity 54 is in direct contact with the beam-arm 6, and no current can pass into the motor and the relays.

Supposing some goods are now put on scale pan 25, the stop 45 will come into contact with 52, current will flow through electromagnet 56 and its movable core X will be attracted, thereby closing contacts a and b, so that current will now flow through the armature in the direction indicated by the arrows 1 and thence through the field coil of the motor as indicated by arrows III. The motor will revolve, therefore, and drag the poise until equilibrium is obtained when 45 will cease to be in contact with 52, whereupon contacts a and b are opened so that the motor will stop and, consequently, also the poise. On the goods being removed from the scale, 45' comes into contact with 52, and current flows through the electro-magnet 56' and its movable core X will be attracted thereby closing contacts a' and b'; current then flows through the armature in the direction indicated by arrows II and thence again through the induction coils of the motor, as indicated by arrows III. It will be noted that the current is reversed through the armature without being reversed through the field coils. The torque acts in the opposite direction until the contacts 45 and 52' are cut out, the poise then having been returned to the position which corresponds to the equilibrium of the balance under no load, that is to say to its initial position.

It may happen that, although current is cut out in the motor, the latter will make a few more revolutions by reason of its own fors viva or momentum. In such a case, the stop 45 would part from contact 52, but, the position of equilibrium being passed, the stop 45', would contact with 52'. The motor therefore would not only be blocked but caused to revolve in the opposite direction. Consequently, the poise which would have passed its equilibrium position, would be returned thereto. Owing to momentum as before there might occur a certain amount of rocking of the beam previous to final equilibrium being established, but this rocking would eventually become less.

In order to prevent these rockings becoming too numerous, that is to say in order to eliminate them as quickly as possible the following procedure is adopted:

At one of the two ends of the motor shaft a brake with discs 57 and 57' (Figs. 1 and 2) is provided. In the normal position, disc 57" is pressed against disc 57 by a spring 57" while its square stem 58 can slide on support 59 but cannot rotate. An electro-magnet, having two windings 60 and 60', attracts the stem 58 when current flows through windings 60 or 60' or through both so as to separate discs 57 and 57'. The electric connections are arranged in the manner shown in Figure 10 or in Figure 11, and it will be seen that when no current flows through electro-magnets 56 and 56', that is to say when the balance is in equilibrium, the motor is braked. When the equilibrium is upset, current flows through electro-magnets 56 or 56', and a contact is made at c or c' (due to springs 61) before being made at a or a' and b or b', current flows through the winding 60 or through the winding 60' or both according to the circuit employed and, therefore, the motor is released previous to being started. When equilibrium is achieved, the current is cut out in electro-magnets 56 and 56', whereby the motor is immediately braked, the circuits including the coils 60, 60' being broken at c, c', thereon spring 57" returns disc 57' to 57. In this manner the number of rockings is considerably reduced and can be increased or decreased as desired either by adjusting the contacts 52, 52' (Fig. 9) carried on the nut members 50 and 51 or by using electro-magnets with adjustably retarded action, this retarding of the action of the electro-magnets being obtained either by means of air bellows or by means of a liquid dash-pot.

The following is a description of the manner in which a machine, in accordance with the present invention, is made to show the weight of goods to be weighed.

Persons skilled in the art are aware that the length of the displacements of the poise of a steel-yard are proportional to the weight put on the scale. Thus, the length of any shifting can be very easily and nicely measured by the number of turns of the screw 37. It is only necessary, therefore, to connect with the motor a counter showing the number of revolutions and to effect a suitable adjustment of the two so that a reading of the weight of the goods can be obtained from the said counter; this reading can be made with all desirable accuracy and will include function of the pitch of the screw 37, of the weight of the poise and of the length of the beam-arm 6.

Under such conditions, however, the balance would keep fairly accurate only if goods of a lower and definite weight, say one kilogram, were weighed.

As a matter of fact, to avoid unnecessary encumbrance, the beam-arm 6 need not be more than 50 centimeters long, and this would apparently give a pitch of 2 millimeters.

Supposing that 250 revolutions of the motor are required to obtain the maximum 500 m/m shifting and supposing said shifting corresponds to a weight of 1000 grams, then, evidently, for one gram the shifting will be $\frac{500}{1000}$ that is ½ m/m corresponding to ¼ a revolution of the motor, the pitch being 2 m/m, which permits the ready ascertaining and registering of 50 centigrams, corresponding to ⅛th of a revolution of the motor. As will be seen there is thus a bottom limit of half a gram and a top limit of 1000 grams.

If a more accurate balance is desired, it is only necessary to provide a poise of less weight, say a poise with which a 500 m/m shifting will correspond with 500 grams, in which case 1 m/m shifting is allowed for one gram, i. e. one quarter of a gram for ⅛th of a revolution. In such cases, one quarter of a gram would be the bottom limit and 500 grams the top limit.

Continuing in the same manner, the sensibility would obviously be increased twofold each time and decreased by one half of the range of the balance up to the limit of accuracy of this kind of balance which has been proven to be of the centigram order and even finer.

Taking now the general case where the sensibility corresponds to 50 centigrams and the range to 1000 grams, in order to increase this range, a weight balancing the selected unit (1000 grams in the case considered), is placed on the scale 26. Thereby the range is doubly increased. By putting $n$ of these weights on the scale, the range would be enlarged to $n \times 1000$ grams.

The above result is achieved in the following manner:

The motor 55 drives the screw 37 through equal gears 63 and 64 (Figures 1 and 13). The gear 63 is idle on the motor shaft to which is keyed a claw clutch 65 which can be operated by fork 66, and which, owing to the action of the spring 67, (Fig. 13) normally leaves the motor in engagement with the screw 37. On reaching the end of its travel, the nut 40 of the poise compresses the spring 68, (Fig. 12) thereby slowing down the motor. A finger 69 (Figs. 10 and 12) attached to the poise pushes on the top 70 of the lever 71 which rocks about 72, and the rod 37 carries on each of its ends a member, such as 73, the lower part of which plunges at each revolution of the rod 37 into an oil-filled container 74. At the end of the travel of the poise, the rocking of the lever 71 brings the two contacts 75 and 76 into touch at the required moment, thereby closing the electric circuit in one of the windings of the double electro-magnet 77 (Figures 1 and 10, 12 and 13). The block 45 (Fig. 9) supposed in contact with 52, that is so to say in the case where the goods placed on the scale are of heavier weight than can be counterbalanced by the poise at the farthest end of its travel (say 1 kilogram) and accordingly current will flow from source 54, through 45 and 52, through the windings of coil 77 and out through the member 73 and rocking lever 71 (see Fig. 10) operated by the finger 69 or the poise. The electro-magnet 77 being energized attracts the fork 66 (Figs. 1 and 13) releases the screw 37 from the motor and throws into gear the worm 78. This worm drives a toothed quadrant 79 which is the main wheel of an epicyclic train 80 (Fig. 14), the train driving the shaft 81 on which are keyed a series of suitably designed cams, such as 82.

Supplementary weights, such as 83, (Figs. 1 and 15) to be placed on the scale 26, and each corresponding to goods of 1 kilogram in weight, are each suspended at 84' from the ends of a lever, such as 84, which rocks around a common spindle 85 common to all such levers and rests on a cam 82 through rollers 86 by which it is operated.

By revolving the shaft 81 it is possible to put on or lift off any weights as desired, the cams being plotted in view of the required result for such and such definite displacements of the shaft 81.

Assuming that 250 revolutions of the motor 55 are required to weigh and, consequently, to indicate 1000 grams on the counter 62, (Figs. 13 and 19) the number of motor revolutions necessary to put on the first supplementary weight 83 will be 250, the number of motor revolutions to put on the second weight will be 500, and so on. Admitting also that the cams are so plotted and set that when the shaft 81 makes 1/10th of a revolution the first weight will be put on, that when the said shaft makes one fifth of a revolution the second weight will be put on and that when the said shaft makes 9/10ths of a revolution the ninth weight will be put on, then while the motor makes 250 revolutions the shaft 81 will have to make 1/10th of a revolution. The required reduction ratio is, therefore, 1/2500, which is precisely what is obtained, on the one hand, by means of the worm 78 and the toothed quadrant 79 reducing by 1/25 and, on the other hand, by means of the epicyclic train 80 reducing by 1/100.

When, therefore, the motor has made 500 revolutions the counter will mark 2000 grams, and so on until the weight becomes greater on the side opposite the goods, and, for the sake of explanation, those goods may be taken to weigh less than 10 kilograms.

At this moment, the beam-arm 6 will tilt in the other direction, stop 45' will come into contact with 52', the current will be cut out in electromagnet 77 (Figure 10), and the clutch 65, returned by spring 67, will release the cam-shaft and throw into gear the screw 37 which will drive the nut 40 in the required direction and, at the same time, cut out contacts 75 and 76, since the finger 69 is moved away.

Supposing that three weights, such as 83, have been displaced by the cam-shaft so as to bring the beam-arm 6 to its down position, this shows that the goods weigh less than 4 and more than 3 kilograms. Therefore, equilibrium will be obtained with an intermediate position of the poise. Supposing this position corresponds to 200 grams, the weight of the goods will be shown to be 3 kilograms 200.

The counter must then denote 3200 grams, that is to say it must have made $250 \times 3 + \frac{250}{1000} \times 200 = 800$ revolutions.

The counter has first made $250 \times 4 = 1000$ revolutions in one direction and then 200 revolutions in the opposite directions i. e. 800 revolutions, which is in accordance with the desired result.

This being so, when the goods, whose weight has now been ascertained, are removed from the scale, the stop 45' comes into contact with 52' and the nut continues its travel to the right hand side up to its extreme position where there is a device similar to the one shown in Figure 12 which, by means similar to those already described, send current into the second winding of the electro-magnet 77, thereby releasing screw 37 and throwing into gear the cam-shaft 81 which, revolving in the opposite direction to the previous one, lifts off all the weights so that, the balance being returned to its no-load equilibrium position, the motor stops. In order to compare the weighings it is essential that, when the balance is unloaded, the beam should always be in one and the same position, say horizontal, and in order that it shall always be so the following procedure is adapted:

On the frame 23' of the machine in two positions almost at right angles to one another two tubes 88 and 88' forming a U (Figure 17) and partly filled with some conductor liquid are secured. The surfaces of the said liquid in each tube being, of course, on a horizontal plane. Screws, such as 89 and 89', are adjusted so as to contact with the liquid so that when the machine, indicated diagrammatically by the rectangle $m$, is level current from the source of energy 54 can take part in the operation of the balance. If, from any cause, however, the frame should happen to become inclined, current would be cut out and (in order to facilitate such cutting out, oil may be poured over the conductor liquid which may, for instance, be mercury) and in no case could current then flow through the various relays and circuits. Further, the machine can be reset in the proper position by means of setting screws and air levels permanently fixed thereto.

From the foregoing description it will be apparent that a balance constructed in accordance with this invention will indicate weight to a very wide range and with far greater accuracy than balances used in the prior art.

Assuming, for instance, that a 500 m/m shifting of the poise corresponds to 250 grams, a 1 m/m shifting of the said poise will correspond to half-a-gram i. e., with a 1 m/m pitch, 12.5 centigrams for one quarter of a revolution, and since 9 weights corresponding to 250 grams each, can be put on, a balance is obtained offering a 2 kilog. 500 range with a sensibility of decigram order.

Assuming that a 500 m/m shifting of the poise will correspond to 5000 grams, a 1 m/m shifting will correspond to 10 grams. Supposing a 1 m/m pitch, 2.5 grams will then correspond to one quarter of a revolution and 50000 grams will therefore be the maximum range with a 2 gram sensibility.

Supposing this balance is attached to lever arms, such as those shown in Figure 18, which allow of 100 or 1000 ratio, it is possible to weigh 5 tons to within 200 grams or 50 tons to within 2 kilograms.

The following is a description of the device permitting the total price and the price per unit to be indicated.

Supposing the shaft 90 (Figs. 13 and 19) is connected with the weight-counter 62 and such shaft makes 250 revolutions for 500 grams, this balance will be able to weigh up to 5 kilograms with 9 auxiliary weights. The shaft 90 transmits its motion to the shaft 91 through a speed reducing system comprising gear 92 and epicyclic train 93 (Figure 19). If it is required, for instance, that the shaft 91 makes only one revolution while the gear 92 makes 250 revolutions, the ratio of the gear 92 to the main wheel of the train would have to be $\frac{1}{2.5}$ and the ratio of the epicyclic train 1/100. The shaft 91 is the driving shaft of the price indicating system and is enclosed in a casing only connected with the remainder of the balance through the toothed wheel 92.

The shaft 91 drives several gear boxes, the first one at a 1/1 ratio through gears 93 and 94 (Fig. 1), the second one at a 1/5 ratio through gears 95, 96, 97, 98, the third one at a 1/20 ratio through gears 95, 96, 99, 100, 101, 102, the fourth one at a 1/100 ratio through gears 103, 104, 105, 106, 107, 108 and so on, if necessary, with other gear boxes, in Fig. 1, only the first of those gear boxes is shown.

The first of the gear boxes (Figures 19, 20 and 21) comprises a shaft 109 driven by control pinions 93 and 94. The said shaft carries two sliding gears, one of which has two pinions 110 and 111 driven by the fork 112 either to the left or to the right in order to throw into mesh either 110 with 113 or 111 with 114, pinions 113 and 114 being keyed on the countershaft 115 on which is keyed pinion 116 meshing with 117 integral with the driven shaft 118. The other sliding gear carries a pinion 119 integral with a claw sleeve 120 driven by the fork 121 adapted to throw 119 into mesh with 122 or to connect the shaft 118 directly.

It is thus possible to obtain for the shaft 118 four different speeds and if, for instance, the shaft 109 makes one revolution the shaft 118 will make:

$\frac{20}{40} \times \frac{20}{40}$ = one quarter of a revolution.
$\frac{30}{30} \times \frac{20}{40}$ = one half of a revolution.
$\frac{36}{24} \times \frac{20}{40}$ = three quarters of a revolution.
direct connection = 1 revolution.

For similar reasons, and by somewhat similar mechanism operated by forks, the shaft 123 driven by 124 will make, while 109 or 91 makes 1 revolution, either 5/4ths of a revolution or 10/4ths of a revolution or 15/4ths of a revolution, supposing this second gear-box to have only three speed-changes.

Similarly, the shaft 125 driven by the shaft 126 in the third gear-box will make 20/4ths, 40/4ths, 60/4ths or 80/4ths of a revolution and, as to the fourth gear-box, the shaft 128 will make 100/4ths, 200/4ths, 300/4ths, 400/4ths of a revolution.

Shifting of the forks is obtained as follows:
Tenons 129 and 130 of forks 121 and 112 (Figure 21) slide in grooves or slots 131 and 132 so designed as to cause suitable movement of the two sliding gears, the said grooves or slots being cut in one or both faces of a circular plate 133 (see Figs. 20 and 21 respectively) driven by two bevel pinions 134 and 135 (Figs. 21 and 22), by pinion 136 meshing with the toothed periphery of a wheel 138 which carries keys 139, 140, 141, 142 and is secured on a shaft 143, and constitutes a control for the gears. An operator, by putting one of his fingers on one of the keys is thereby able to rotate the wheel and consequently one of the sliding gears, to a position corresponding to where the finger meets the stop 144 and, at this moment, a latch 145 falls into its proper notch 146 which is provided in a sector or quadrant 147 fixed to the shaft 143. The said latch is intended to lock the fork in a predetermined position corresponding to a definite speed. Every change of speed is organized in the same manner and has its own series of keys 148, 149, 150 . . . 159 (Figure 23). Fifteen different speeds can therefore be obtained.

This being so, the driven shafts 118 and 123 of the first and of the second gear-boxes are connected with the pinions 160 and 161 of an epicyclic train (Figure 1), which arrangement permits the shaft 163 to be rotated at a speed equal or proportionate to the sum of the two speeds of the shafts 118 and 123.

Calling these two speeds $\omega^1$ and $\omega^2$, 162 will revolve at a speed $\omega^1 = K(\omega^1+\omega^2)$ and the ratio of the pinions can always be selected in such a way that K is equal to 1, in which case $\omega^1 = \omega^1+\omega^2$. The shaft 162 transmits its motion through a series of pinions to the shaft 163 which, in its turn, drives, through the pinion 164, a pinion 165 of a second epicyclic train, while the other pinion 166 of the said train is driven by the shaft 125 of the third change speed gear or gear-box.

Then, for the same reasons as before, if $\omega^3$ is called the speed of the shaft 125, the shaft 167 will revolve at a speed $\omega^4 = \omega^1+\omega^3 = \omega^1+\omega^2+\omega^3$. Similarly, the said shaft 167 drives a pinion 168 of a third epicyclic train the other pinion 169 of which is driven by the driven shaft 128 of the fourth gear-box, and, therefore, the shaft 170 will revolve at a speed equal or proportional to $\omega^1+\omega^2+\omega^3+\omega^4$.

The same thing could be continued with a fourth differential gear and fifth change speed or gear-box.

In practice, three differentials and four change-speed gears are sufficient. The shaft 170 transmits its motion to a revolution counter 171 which, consequently, registers the speed sum $\omega^1+\omega^2+\omega^3+\omega^4$.

This being so, it will be readily understood that, when the weight shaft 90 makes 250 revolutions, the shaft 118 can make either one quarter, two quarters, three quarters or four quarters of a revolution, the shaft 123 can make either five quarters, ten quarters or fifteen quarters of a revolution, the shaft 125 can make either twenty quarters, forty quarters, sixty quarters or eighty quarters of a revolution, and the shaft 128 can make either one hundred quarters, two hundred quarters, three hundred quarters or four hundred quarters of a revolution.

Connection between the shaft 170 and the counter 171 is effected in such a way that when the said shaft 170 makes one quarter of a revolution the counter will mark $0^r,05$ and on the key 139, which throws this speed into gear, will be inscribed $0^r,05$. When the shaft 170 has made 2/4ths of a revolution, the counter will mark $0^r,10$ and this will therefore be inscribed on the key 140, and by the same calculation $0^r,15$, $0^r,20$, $0^r,25$ and so on, will be inscribed on the respective keys, as shown in Figure 24.

Let it now be assumed that the mechanism is thrown into gear by depressing, as hereinbefore indicated, the $0^r,15$, $0^r,50$ and $10^r$ keys. The number of revolutions of the shaft 170 will be (always assuming, of course, that the weight-shaft makes 250 revolutions) $200/4+10/4+1/4 = 211/4$, it being clearly understood that, owing to the properties of the differential, all the driven shafts can revolve both simultaneously and separately.

In the case considered, the counter 171 will, therefore, make 211/4ths of a revolution and, consequently, mark $10^r,55$. Now, 250 revolutions of the shaft 90 correspond to the selected weight-unit, say 500 grams. In the present case therefore the counter shows the unit price of the goods, taking 1/2 kilogram as the unit.

It will be readily seen that operation of the various keys enables all the unit prices from $0^r,05$ up to $24^r,95$ a half-kilogram to be obtained, and this by increase of 5 centimes. If, for instance, the $0^r,05$, $0^r,50$ and $10^r$ keys are thrown into gear and 500 grams are placed on the scale, the counter 171 will mark $10^r,55$.

Assuming now that, instead of 500 grams, some other weight, say 1 kilogram 720 grams is placed on the scale, the weight-shaft 90 will make $250+250+250+110 = 860$ revolutions. Now, for 250 revolutions the counter will mark $10^r,55$; for 860 revolutions it will mark $\frac{10,55}{250} \times 860 = 36^r,29$, which is the price of 1 kilog. 720 of goods at $10^r,55$ a half kilogram.

Thus the counter 171 does, in fact, accurately mark the price of the goods put on the scale, provided the proper speeds are thrown into gear, that is to say if the keys corresponding to the unit price are depressed.

The said counter 171 may be marked with skipping numerals, that is to say with numerals skipping from 5 to 5 centimes, the passage from one numeral to the next taking place as soon as 2,5 centimes is passed. In the above case, for instance, the counter would then mark 36ʳ,30.

A necessary condition is that the unit price be shown so as to permit the operator to see that the proper keys have been depressed in order that the said price can be indicated (indication of this price will permit of the nature of the weighed goods to be known) thus enabling both the salesman and the purchaser to check whether the multiplication is correct.

For this purpose, each of the pinions such as 136 (Fig. 22) of each change-speed gear is connected with the pinions of a differential and, for the same reasons as above stated and by the same means, the counter 175 will mark the unit price when the proper keys are depressed the various gears offering nicely predetermined ratios with respect to each other.

But although the weight-counter 62 and the total price counter 171 are automatically returned to zero after every weighing, it is necessary to provide means whereby the unit price counter 175 may be also automatically returned to the zero position, for, if such means were not provided and the operator forgot to return the keys to their initial positions, that is to say their disengaged positions, there would be a risk, on the next weighing, that erroneous prices might be registered should the goods next weighed not be of the same unit price as the previous goods and the second operator failed to observe whether the unit price of such goods was correctly set prior to their being placed on the scale.

In order to achieve the desired result, the procedure is as follows: One of the latches, such as 145, which is held in the notch 146' by spring 176 (Figure 22) thereby locking the sector 147 in a definite position, has to be released therefrom at the requisite time. To this end, latch 145 carries a rod 145' (Fig. 26) adapted to be attracted by the electro-magnet 177 operating when the button 178 is depressed (Figs. 10, 25 and 26).

This operation is brought about in the following manner:

The contacts d—d', are electrically connected only when there is no current in the electro-magnets 56 and 56' (Figures 10 and 25) that is to say when the balance is in its equilibrium position, when, therefore, the weight-counter indicates accurately the weight of the goods being weighed, current from the electric source passes through the said contacts d—d', and then through the electro-magnet 180 which brings the two contacts 181 and 181' together, thereby causing current to flow through the electro-magnets 177 adapted to release the latches 145, as shown in Figures 25 and 26.

As soon as the button 178 ceases to be depressed contact is broken, since the said interrupter-button is drawn back by the spring 179, whereby current is cut out in electromagnets 177 and 180, and, the rod 145 being no longer retained, the latch 145 tends to return by the action of the spring 176 (Figure 22). Owing, however, to the various notches such as 146 wherein it may catch, the said latch is liable to arrest the sector 147 while the latter is being returned to its initial stop position by the spring 182, such arrest taking place before the sector has arrived at the end of its travel, that is to say before the return motion of the wheel 138 is completed. As a consequence the unit price counter would be in danger of not being returned to its zero position.

In order to obviate this risk, the following provision has been made. As hereinbefore stated, the button 178 should be operated, i. e. depressed when the balance is in its equilibrium position, that is to say when the counters are at a standstill. If, through an oversight, the button was operated before the counters had stopped one of the contacts d and d' would be open and the other closed, and current would not flow through electro-magnet 180 and, consequently, neither through the electro-magnets 177.

This having been made clear, let it now be assumed that the balance is in its equilibrium position when the button 178 is depressed. This will cause the rod 145' to be attracted and the wheel 138 will be returned to its initial position, being propelled by the spring 182 (Figure 22). When the button 178 is released the current is cut out but the rod 145' is held owing to the rocking latch 183 occupying the notch 184, provided on the rod 145', the latch 183 having been moved into the notch 184 by the influence of the spring 185 (Figure 26). When the wheel is almost at end of its travel, that is to say when the latch 145 is no longer liable to meet notches such as 146, a boss 186, provided on the said wheel, bears on the second arm of the lever of the latch 185, thereby releasing the rod 145 which returns to its initial position.

In this way, therefore, the unit price counter is positively returned to zero.

The above described movements are carried out in an exactly similar manner with every subsequent weighing.

In order to obtain indications on the two faces of the balance, the weight-shaft 90 and the unit-price-shaft 175' and the total-price-shaft 171' can be arranged that they will each drive two shafts. For instance, the weight-shaft 90 will drive shafts 187 and 188 (Fig. 27) carrying a counter each, and the same numerals would then appear through the apertures 189 and 189' located on each side of the casing of the balance.

The following is a description of the registering and totalizing device, the three shafts, viz, the weight-shaft 90, the total-price-shaft 171' and the unit-price-shaft 175' being considered. Registering in any of the known methods, or in the following manner may be obtained.

Type wheels 91', 171" and 175" (Fig. 29), which are driven in proportion to the indicators 62, 171 and 175, are so arranged that the same numerals will be reproduced diametrically but in different vertical planes, each type wheel being of the shape shown in Figure 28. This being so, the rollers 190 and 191 are secured in a chest (Fig. 29), each of which rollers carries, wound around it, a paper strip A, suitable means being provided to cause the strip to pass from the rollers 190 along the type wheels 175', 171' and 191' and wind around 192. This is the control strip; another one, or ticket delivering strip A, is wound around 191 from which it passes along the type wheels to get out at 193. A group of type discs 191', of well known design, permits the month, day of the month, and number of the weighing to be inscribed on the ticket.

The working is as follows:

As hereinbefore explained, when the interrupter 178 (Figure 25) is depressed, the rod 194 (Fig. 29) is attracted by the electromagnet 180. One of the ends of the said rod being of suitable shape such as shown at 195, lifts the levers 196 and 196' which rock around the spindles 197 and 197' and each of which carries four hammers 198, 199, 200, 201 and 198', 199', 200', 201' that strike on the proper strips, thereby printing on the said strips the corresponding figures of the type wheels and of the type discs 191'. Inking is effected by any suitable means. The rod 194 continues its travel, end 195 becomes released from the levers 196, 196' which are moved away from the strip by springs indicated at 250 and 250'. The said rod causes, through a finger 202, the ratchet arm lever 203 to be rocked around the spindle 204, and, owing to the ratchet 205 and the ratchet wheel 206, drives the drum 207 which advances the two paper strips a predetermined distance, one of which, the control strip A, is wound on 192 and the other of which B is unwound the required amount from 191. The rod 194 continuing its travel, the finger 208 rocks the lever 209 which governs the cutter 210 and this cutter severs the ticket. A series of press-buttons, such as 211, enables each salesman to print his own mark on the ticket which is then handed over to the purchaser for payment to the cashier.

The said ticket bears, therefore, the following indications: weight, unit price, total price of the goods weighed, the date and number of the weighing and the identifying mark of the salesman.

The rod 194, continuing its travel a short distance farther, puts into electric connection the two contacts 181 and 181' (Figures 29 and 25) of the unit-price-sector-returning magnets 177, whereby the said sectors are returned to their initial position, as hereinbefore explained. As soon as the interrupter 178 is released the rod falls back of its own weight and, actuated by the spring 212, the end 195 is returned to its initial position and the whole mechanism is ready for another registering.

The totalization is effected in the following manner: Connected with the total-price counter 171 is a totalizing counter 213 (Figure 30) adapted to be driven in one direction only through a pawl 214 pivoted upon 171 and through a ratchet wheel 215 integral with 213. The ratchet or pawl 214 has two branches (Figure 31) one of which 214' is pressed into contact with the ratchet wheel 215 by means of the spring 214' but can, owing to a device operable manually such as is indicated at 216 by a push button, place its second branch 214" into contact with a second ratchet wheel 215', also attached to the totalizing counter 213, adapted to move in the direction opposite to that of 215 whereby, if desired, the totalizer can be driven in the return-to-zero-direction of 171, the purpose being to enable this to be done in the event of a weighing having to be cancelled. The totalizer would then be returned to the position it occupied previous to such weighing and the totalization would remain always accurate. In this manner the amount of the takings can be known at any time.

The general working is as follows:

Let it be assumed that the machine is set in such a way that the useful length of the rod 37 is travelled over by the nut 40 at the end of 250 revolutions and that the limit position of the poise corresponds to 500 grams.

Assuming now that goods weighing 1200 grams are placed on the scale pan of the balance, the balance being, of course, in equilibrium. At that moment the contact 45 of beam-arm 6 will come into electrical connection with the contact 52, and current from the electric source 54 will flow through electromagnet 56, thereby connecting the contacts a, b, c and cutting out d. Consequently, the electric motor 55 will be started and will drive the poise through nut 40. When said nut has arrived at the end of its travel the motor will be slowed down owing to the resistance of spring 68 and the finger 69 will put into connection the two contacts 75 and 76, thereby sending current into the releasing magnet 77 which engages the claw on the camshaft-controlling device 78 (after having released the threaded rod 37). Two weights corresponding each to a 500 grams weight placed on the scale are thus put on (these weights have a value lower than 500 grams as the Roberval lever arms are unequal). The motor will than have made 250×3=750 revolutions by the time the second weight is put on, contacts 45 and 52 are broken, electromagnet 56 receives current no longer, contacts $a$, $b$, $c$, are broken and there is an immediate braking of the motor. The arm 6 continues to travel, however, thus causing contact between 45′ and 52′, and current flows through electro-magnet 56′ but no current at all passes through electro-magnets 56 and 77. The result is that, on the one hand, the cam shaft is thrown out of gear while, on the other hand, screw 37 is thrown into gear through contacts $a$, $b$, $c$, and the motor being then unbraked revolves in the direction reverse to the previous direction and contacts 75 and 76 are disconnected (in fact, current had ceased to pass between them). The motor brings therefore the poise back in the other direction and, when said poise reaches a certain position at the end of 150 motor revolutions in this direction, current is cut out in electro-magnet 56′, and consequently at contacts $a'$, $b'$, whereby current is cut out to the motor and then at $c'$, whereby the said motor is braked ($a'$, $b'$ first and previous to $c'$ on account of the springs). In spite of this immediate braking, however, and owing to momentum or fors viva, the motor will make about 5 revolutions too many. Then 45 comes back into contact with 52 the same phenomen, but in the opposite direction, take place, the rod 37 making 6 revolutions in the contrary direction, that is to say one revolution too many. Braking and stopping having been rendered more immediate than before since the motor has had no time to acquire its working speed, the contacts are again changed and the rod makes one revolution in the opposite direction which properly corresponds to the equilibrium position, the latter being thus obtained at the end of two beats. The counter has made 3×250−150=600 revolutions and, as it is set to mark 500 grams for 250 revolutions, it will mark $\frac{500 \times 600}{250}$=1200 grams, which is what is required. If goods worth 4ᶠ,55 a half-pound (500 grams) are being dealt with, and it is desired to ascertain the price of said goods before the goods are placed on the scale the 4ᶠ, the 50 centimes and the 5 centimes keys are depressed. (If the goods were deposited and the operator forgot to depress the keys, the price-device would mark nothing, thereby signalling the oversight at once). It is known that 91 makes one revolution when 90 makes 250 revolutions and it is also known that when the 0ᶠ,05 key is depressed the shaft 118 will make, with this setting ¼th of a revolution, that when the 0ᶠ,50 key is depressed the shaft 123 will make 10/4ths of a revolution and that when the 4ᶠ key is depressed the shaft 126 will make 80/4ths of a revolution. Therefore the price-shaft 171′ will make $$80/4+10/4+1/4=91/4\text{ths}$$

of a revolution for 250 revolutions of 90. It is known that, in this case, 90 will make 600 revolutions. Consequently, the price-shaft will make $91/4 \times \frac{600}{250}$ revolutions. This being so, the price-counter 171 is set to mark 0ᶠ,05 for one-quarter of a revolution on the shaft 171′. Therefore, it will, for one revolution, mark 0ᶠ,20 and for 91/4ths $\times\frac{600}{250}$=54,6 revolutions it will mark 54,6×0,20=10ᶠ,92. But, as the said counter has its wheel marked with numerals skipping from 5 to 5 centimes, it will mark 10ᶠ,90.

The price of the goods is, $\frac{4,55 \times 1200}{500}$= 10ᶠ,92 which corresponds with sufficient accuracy with the indications on the counter.

On the other hand, by depressing the three 0ᶠ,05, 0ᶠ,50 and 4ᶠ keys, the counter 175 is caused to mark 4ᶠ,55, the unit price of the goods.

This being so, in order to register these various indications the button 178 is depressed while the counters are in the stop position. Current is thus made to flow through the registering electro-magnet 180, and since there is no longer current in electro-magnets 56 and 56′, in consequence, contacts $d$ and $d'$ are electrically connected.

It is, therefore, readily seen that the registering electro-magnet 180 can only be made to operate when the balance is in equilibrium and not while it is rocking, for the relay 180 having adjustably retarded action, will act only when the arm of the beam is motionless and poised.

If, therefore, the button 178 should happen to be depressed before the counters are at a standstill, that is to say before equilibrium is attained, the registering device would not be able to work. On the other hand, it is essential that the operator should be at liberty to register when he desires, and for this reason the button 178 which would otherwise be unnecessary is provided, registering being, in its absence, automatic.

In the case of automatic registering, then, in the event of a customer finding the goods too dear and declining to pay the price, the control strip would register a price unpaid, a ticket and a weighing would be wasted. As it is, and due to the action of the said electro-magnet, the registering strip is printed, the ticket is issued at 193 marked with the weight, the unit price and the total price of the goods as well as with the number of the weighing, the date and any other indications printable by means of a set of type discs of known form, the salesman also having made his own mark on the ticket by means of the printing or perforating punch 211. The same indications having been inscribed on the control strip, the electro-magnets 177 of the keys operate, returning the said keys to their initial position while the totalizing counter 213 adds 10ʳ,90 to the preceding sum and, lastly, as the button 178 ceases to be depressed after having withdrawn the ticket, the keys are returned to their initial position and the weighing operation completed.

To sum up:

A. In order to make a weighing:
(a) The unit price is set by means of the keys.
(b) The goods are placed on the scale.
(c) The button 178 is depressed (preferably when the counters are at a standstill).
(d) When the button 178 is released the keys return to their equilibrium position.

B. The following is therefore obtained:
1. A ticket for payment to the cashier.
2. A salesman's mark on the said ticket in view of the settlement of his commission.
3. A control strip which will permit the checking of the cash, and the total weight of each sort of goods sold during a definite time (since said goods self indicate themselves by their unit price).

C. It is possible always to know at the end of the day what stock remains on hand and to detect any loss.

D. It is possible to know the total price per article sold within a definite time.

E. Serial numbering of the weighing prevents the possibility of the purchasers walking out without paying, since, the tickets have generally to be produced to the cashier in sequence and he would be able at once to ascertain that a ticket had not been handed in and the defaulter could therefore be detained or identified.

F. The checking of the takings is doubly ensured (1) by the control strip, and (2) by the totalizing counter.

The result is that every desirable checking is secured, except, however, the checking of the unit price marked by the salesman. To obviate this drawback, provision is made as follows:

The sector or quadrant 147 has in each of its notches 146 a contact 217 (Fig. 32) insulated from the mass and electrically connected by means of an insulated wire 218 which, proceeding from the said contact to the hollow shaft 143, runs through the latter, is led to the coil of an electro-magnet and connects with one of the poles of an electric source such as 220. The other pole of said source is connected with latch 145 and brings current to the contact 222.

As will be apparent, therefore, when the latch 146 is in stop position, it is only necessary to switch on the interrupter 221 to close the circuit, whereby the rod 223 of the electro-magnet is attracted, bringing the figure that precisely corresponds to the key actuated opposite the fixed aperture 224.

Each of the sectors is fitted up in the same manner so that, supposing a balance is located some distance from the supervisor of the firm and the distance is such that the supervisor cannot read the unit price marked but can see what kind of goods are being weighed, he has but to switch on interrupter 221 to ascertain whether the salesman has marked the proper price, and he can do this without the salesman being aware of his supervision, the apertures 224 being, of course, located near the supervisor. Several balances can be supervised in this way.

It may happen that a balance may be appropriated to the weighing of a single kind of goods. If so, the balance can be quite out of the supervisor's sight and yet supervised by him in the above described manner.

Having now particularly described and ascertained the nature of my said invention and in what manner the same is to be performed, I declare that what I claim is:

1. An automatic balance for indicating and recording the weight, the unit price and the total price of goods placed on the scale of the balance, as well as for recording the number of weighings and indicating the amount of takings obtained within a definite time, said balance comprising a beam pivoted intermediate its ends, one of the arms of said beam being arranged to support the goods to be weighed and the other arm being provided with a weight pan for supporting additional counterbalancing weights, said latter arm including two parallel rods, a poise adapted to travel along said rods, nut and screw mechanism connected to said poise for shifting the same, an electric motor for operating said screw, means controlled by the movement of said beam for automatically starting and stopping said motor, means controlled by the movement of said poise for reversing said motor, a revolution counter operatively associated with said screw and graduated to indicate the weight of the goods placed on said scale, means operated by said poise at the end of its travel in one direction for placing additional counterbalancing weights upon said weight pan to permit the carrying out of the weighing operation, said reversing means operating automatically to return said poise along said screw the required distance to complete the weighing operation, the movements of said beam upon removal of the weighed goods operating automatically, through control of said motor, to return said poise to starting position, means for removing said additional weights as said poise returns to starting position, means for de-energizing said motor when said poise reaches its starting position, and total-price, unit-price and recording mechanism associated with said revolution counter.

2. An automatic balance according to claim 1, in which said poise includes spherical rollers adapted to move along said rods, cross-ties connecting said rollers, a cross-member connecting said cross-ties, said cross-member being provided with hollow portions and with a vertical rod terminating in a spherical portion, and two facets adjustably mounted upon said nut and located upon opposite sides of said spherical portion, whereby motion in either direction is transmitted by said nut to said poise.

3. An automatic balance according to claim 1, in which the means controlled by the movement of the beam for automatically starting and stopping said motor includes a contact carried by said beam at its poise end in constant connection with a source of electricity, and an adjustable stop mounted upon each side of said contact and each connected with a motor-control relay, said contact being adapted to oscillate between said stops and to rest thereagainst alternately in response to rocking of said beam, whereby said motor is periodically reversed until said poise reaches its starting position, said contact, in the balanced condition of said beam, assuming an intermediate position between said stops out of contact with either, removal of the weighed goods disturbing said balanced condition and effecting return of said poise to starting position by control of said motor through said contact and said stops.

4. An automatic balance according to claim 1, in which said poise includes spherical rollers adapted to move along said rods, cross-ties connecting said rollers, a cross-member connecting said cross-ties, said cross-member being provided with hollow portions and with a vertical rod terminating in a spherical portion, and two facets adjustably mounted upon said nut and located upon opposite sides of said spherical portion, whereby motion in either direction is transmitted by said nut to said poise, the means for placing additional counterbalancing weights upon said weight pan including mechanism set into operation when said poise reaches the end of its travel in the counterbalancing direction for automatically placing additional increments of weight in succession upon said weight pan until the poise side of said beam is depressed, whereby the maximum weighing limit of said balance is increased while the sensitivity thereof is preserved.

5. An automatic balance for indicating and recording the weight, the unit price and the total price of goods placed on the scale of the balance, as well as for recording the number of weighings and indicating the amount of takings obtained within a definite time, said balance comprising a beam pivoted intermediate its ends, one of the arms of said beam being arranged to support the goods to be weighed and the other arm being provided with a weight pan for supporting additional counterbalancing weights, said latter arm including two parallel rods, a poise adapted to travel along said rods, nut and screw mechanism connected to said poise for shifting the same, an electric motor for operating said screw, means controlled by the movement of said beam for automatically starting and stopping said motor, means controlled by the movement of said poise for reversing said motor, a revolution counter operatively associated with said screw and graduated to indicate the weight of the goods placed on said scale, means operated by said poise at the end of its travel in one direction for placing additional counterbalancing weights upon said weight pan to permit the carrying out of the weighing operation, said reversing means operating automatically to return said poise along said screw the required distance to complete the weighing operation, the movements of said beam upon removal of the weighed goods operating automatically, through control of said motor, to return said poise to starting position, means for removing said additional weights as said poise returns to starting position, means for de-energizing said motor when said poise reaches its starting position, total-price, unit-price and recording mechanism associated with said revolution counter, said last-mentioned mechanism including a shaft driven by said motor, a plurality of gear boxes operated from said shaft, a plurality of keys associated with each gear box, a gear arranged to be rotated through different angles by said keys, change-speed gear-shifting mechanism operated by said gear to vary the gear ratio between said shaft and the countershaft of the gear box, one or more differentials associated with the countershafts of the plurality of gear boxes and arranged to impart to a revolution counter shaft a speed proportional to the sum of the speeds of said countershafts, said keys having unit prices marked thereon and said revolution counter graduated to show the total price increasing in accordance with the number of revolutions, and a totalizer associated with said counter.

6. An automatic balance according to claim 5, in which the keys having the unit prices marked thereon are connected to a unit-price counter to operate the same, such connection including one or more differentials arranged to actuate the unit-price counter shaft through an angle proportional to the sum of the angles through which the gears are rotated by said keys, and electromagnetically operated mechanism for returning said unit-price counter to zero.

7. An automatic balance according to claim 6, in which the recording mechanism includes recording devices for printing on a ticket the weight, the total price and the unit price of the weighed goods, the said ticket being detached from a delivery strip which is, together with the check or control strip, run through the counters wherein the printing is effected, and a set of type discs arranged to print on each ticket the month, the day of the month and the serial number of the weighing.

8. An automatic balance for indicating the weight of goods placed upon the scale pan, including a beam pivoted intermediate its ends, a scale pan at one end of said beam, a weight pan at the other end of said beam, a weight supported independently of said weight pan, a poise movably mounted upon said beam and arranged to reciprocate between the fulcrum thereof and said weight pan, a rotatable shaft operatively connected with said poise to move the same, a motor for operating said shaft, means including a pair of normally spaced electrical contacts for starting said motor when the scale pan end of said beam is depressed and for reversing said motor when the weight end of said beam is depressed, mechanism controlled by said poise when it reaches the limit of its counterbalancing movement for placing said weight upon the weight pan, whereby the capacity of the balance is increased, means for reversing said machanism to effect removal of said weight upon return of said poise to no-load equilibrium position, means for braking said motor, and a revolution counter operatively associated with said shaft.

9. An automatic balance for indicating the weight of goods placed upon the scale pan and the total price thereof, including a beam pivoted intermediate its ends, a scale pan at one end of said beam, a poise movably mounted upon said beam and arranged to reciprocate between the fulcrum and the other end thereof, a rotatable shaft operatively connected with said poise to move the same, a motor for operating said shaft, means including a pair of normally spaced electrical contacts for starting said motor when the scale pan end of said beam is depressed and for reversing said motor when the weight end of the beam is depresed, braking means for said motor, a revolution counter operatively associated with said shaft, a plurality of driven shafts, change-speed transmission gearing between said shaft and each of said driven shafts, a set of keys for each train of gearing, each set having a key for each change of speed of the associated gearing, said keys having unit prices thereon, mechanism operable by each key for shifting the gears of its associated gearing to drive the driven shaft at the speed corresponding to such key, a total-price counter shaft, one or more differentials operatively related to said counter shaft and to said driven shafts to drive said counter shaft at a speed proportional to the sum of the speeds of said driven shafts, and a total-price counter operated by said counter shaft.

10. An automatic balance for indicating the weight of goods placed upon the scale pan and the total and unit prices thereof, including a beam pivoted intermediate its ends, a scale pan at one end of said beam, a poise movably mounted upon said beam and arranged to reciprocate between the fulcrum and the other end thereof, a rotatable shaft operatively connected with said poise to move the same, a motor for operating said shaft, means including a pair of normally spaced electrical contacts for starting said motor when the scale pan end of said beam is depressed, means including a pair of normally spaced electrical contacts for reversing said motor when said other end is depressed, braking means for said motor, a revolution counter operatively associated with said shaft, a plurality of driven shafts, change-speed transmission gearing between said shaft and each of said driven shafts, a set of keys for each train of gearing, each set having a key for each change of speed of the associated gearing said keys having unit prices thereon, mechanism operable by each key for shifting the gears of its associated gearing to drive the driven shaft at the speed corresponding to such key, a total-price counter shaft, one or more differentials operatively related to said counter shaft and to said driven shafts to drive said counter shaft at a speed proportional to the sum of the speeds of said driven shafts, a total-price counter operated by said counter shaft, said mechanism including a wheel cooperating with each set of keys and arranged to be rotated through different angles by the different keys of each set in proportion to the unit price marked thereon, a unit price counter shaft, one or more differentials operatively associated with said wheels and with said last-mentioned shaft to rotate the latter through an angle proportional to the sum of the angles traversed by the several wheels, and a unit-price counter driven by said last-mentioned shaft.

11. An automatic balance according to claim 1, in which said poise includes spherical rollers adapted to move along said rods, cross-ties connecting said rollers, a cross-member connecting said cross-ties, said cross-member being provided with hollow portions and with a vertical rod terminating in a spherical portion, two facets adjustably mounted upon said nut and located upon opposite sides of said spherical portion, whereby motion in either direction is transmitted by said nut to said poise, the means for placing additional counterbalancing weights upon said weight pan including mechanism set into operation when said poise reaches the end of its travel in the counterbalancing direction for automatically placing additional increments of weight in succession upon said weight pan until the poise side of said beam is depressed, whereby the maximum weighing limit of said balance is increased while the sensitivity thereof is preserved, said mechanism including a gear train having a clutch between the motor and the poise-actuating screw, an epicyclic train including a shaft, a series of cams mounted on said shaft, weight-carrying levers controlled by said cams and adapted upon rotation thereof to deposit weights upon the weight pan until the poise side of said beam is depressed, means operated by said poise at the end of its travel for automatically releasing the actuating screw from said motor and connecting the latter with said epicyclic train, whereby additional weights are placed upon said weight pan and the capacity of the balance thereby increased, means operated upon depression of said poise side of the beam for releasing said epicyclic train and connecting said motor with said actuating screw to drive the poise in the opposite direction until equilibrium is attained, said poise being automatically returned to starting position upon removal of the weighed goods, release mechanism for disengaging the motor from the actuating screw and connecting said motor to said cam shaft, whereby the weights are removed from said weight pan, and a weight-telling counter actuated by the rotary motion of the shaft acting on said epicyclic train.

In testimony whereof I affix my signature.

JULES GOETZMANN.